US010814710B2

(12) United States Patent
Nagano et al.

(10) Patent No.: US 10,814,710 B2
(45) Date of Patent: Oct. 27, 2020

(54) LOWER PART STRUCTURE OF VEHICLE

(71) Applicant: TOYOTA JIDOSHA KABUSHIKI KAISHA, Toyota-shi, Aichi-ken (JP)

(72) Inventors: Koyo Nagano, Toyota (JP); Ryosuke Fukui, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/271,113

(22) Filed: Feb. 8, 2019

(65) Prior Publication Data

US 2019/0255929 A1  Aug. 22, 2019

(30) Foreign Application Priority Data

Feb. 22, 2018  (JP) ................. 2018-030035

(51) Int. Cl.
*B60K 1/04* (2019.01)
*B60L 50/60* (2019.01)
*H01M 2/10* (2006.01)
*B62D 21/18* (2006.01)

(52) U.S. Cl.
CPC ........... *B60K 1/04* (2013.01); *B60L 50/66* (2019.02); *H01M 2/1083* (2013.01); *B60K 2001/0438* (2013.01); *B60Y 2200/91* (2013.01); *B60Y 2200/92* (2013.01); *B60Y 2306/01* (2013.01); *B62D 21/18* (2013.01); *H01M 2220/20* (2013.01)

(58) Field of Classification Search
CPC ...................................... B60R 16/04
See application file for complete search history.

(56) References Cited

U.S. PATENT DOCUMENTS

2013/0192914 A1* 8/2013 Nakamori ............... B60K 1/04
                                                              180/68.5

FOREIGN PATENT DOCUMENTS

JP         2013-103575 A     5/2013

* cited by examiner

*Primary Examiner* — John D Walters
*Assistant Examiner* — James J Triggs
(74) *Attorney, Agent, or Firm* — Oliff PLC

(57) ABSTRACT

The lower part structure of a vehicle includes a battery unit disposed under the floor of the vehicle and attached to the body or the chassis of the vehicle at one or more battery attaching positions, and an under-cover including one or more first cover segments and one or more second cover segments, wherein the one or more first cover segments cover the battery attaching position from below, and the one or more second cover segments are attached to the battery unit and do not cover the battery attaching position from below.

5 Claims, 3 Drawing Sheets

LOWER PART STRUCTURE OF VEHICLE

CROSS REFERENCE TO RELATED APPLICATION

This application claims priority to Japanese Patent Application No. 2018-030035 filed on Feb. 22, 2018, which is incorporated herein by reference in its entirety including the specification, claims, drawings, and abstract.

TECHNICAL FIELD

This specification relates to a lower part structure of a vehicle, the structure including a battery unit and an under-cover disposed below the battery unit.

BACKGROUND

Electrically driven vehicles (such as hybrid vehicles or electric vehicles) are equipped with battery packs that store electric power to be supplied to traction motors. Traditionally, disposition of a battery pack under the floor of a vehicle has been suggested. This structure has the battery pack attached to the vehicle body or the chassis, either directly or via any frame member.

In order to protect the battery packs and/or to improve the aerodynamic characteristics of the vehicles, disposition of an under-cover below the battery so as to cover the lower side of the battery pack has been suggested. Such an under-cover can be composed of a plurality of segments due to convenience in manufacturing.

For example, Patent Document 1 discloses a structure in which a battery unit including a battery pack supported by a frame is mounted on a chassis (a cross member) to be covered from below the battery unit by an under-cover. The under-cover is composed of a front under-cover and a back under-cover disposed behind the under-cover, both attached to the battery unit with screws.

CITATION LIST

Patent Literature

PATENT DOCUMENT 1 JP 2013-103575A

For maintenance of battery units, such a battery unit is demounted from the vehicle. In the demounting, it is necessary to access an attachment position where the battery unit is attached to the vehicle (or an attachment position of the battery unit and the vehicle) normally from the lower side, or the bottom, of the vehicle to release the 10$o$ attachment. In Patent Document 1, as a plurality of attachment positions are covered by the front and back under-covers, such attachment positions are not accessible from below, or from the bottom of the vehicle, unless the front and rear under-covers are removed from the vehicle. In other words, the battery unit cannot be demounted from the vehicle unless the front and rear under-covers are removed from the vehicle. That is, all the cover segments constituting the under-cover (that is, the front under-cover and the back under-cover) need to be removed to demount the battery unit in Patent Document 1. Regarding this point, there is room for improvement in maintenance of batteries. In particular, an increase in size of a battery unit leads to an increase in area of an under-cover that covers the battery unit and thus an increase in the number of the cover segments. In this case, removing all such cover segments is troublesome.

In view of the above, this specification discloses a lower part structure of a vehicle that can save troubles in maintenance of battery units, and thus improve easiness in maintenance of battery units.

SUMMARY

The lower part structure of a vehicle disclosed in this specification includes a battery unit disposed under the floor of a vehicle and attached to the body or the chassis of the vehicle at one or more battery attaching positions; and an under-cover disposed below the battery unit, the under-cover including one or more first cover segments and one or more second cover segments, wherein the one or more first cover segments cover the battery attaching position from below, and the one or more second cover segments are attached to the battery unit and do not cover the battery attaching position from below.

This structure enables release of the attachment of the battery unit and the body or chassis of the vehicle once the first cover segment is removed without removing the second cover segment. This can reduce troubles in demounting the battery unit from the vehicle, and thus improve easiness in maintenance of the battery units.

The first cover segment may partially overlap a part of the second cover segment in a top view; and the first cover segment may be positioned lower than the second cover segment in an area where the first cover segment overlaps the part of the second cover segment.

Disposition of the first cover segment and the second cover segment such that these segments partially overlap each other can reduce the space at the boundary between the first cover segment and the second cover segment and enables more reliable protection of the battery unit. Further, disposition of the first cover segment below the second cover segment in the overlap area facilitates removal of the first cover segment to the lower side of the vehicle, or through the bottom of the vehicle, without removing the second cover segment.

The battery unit may have one or more connection portions at one end thereof, the connection portion for electrical or mechanical connection to another device, the lower part structure may include a protector for covering the one or more connection portions from below, and the protector may be removable from the vehicle without removing the second cover segment from the vehicle.

This structure enables release of the attachment of the battery unit and other members without removing the second cover segment. This can improve easiness in maintenance of the battery units.

In this case, the protector may partially overlap a part of the second cover segment in a top view, and the protector may be positioned lower than the second cover segment in an area where the protector overlaps the second cover segment.

This structure can reduce the space at the boundary between the protector and the second cover segment and can more reliably protect the connection portion. Further, disposition of the protector below the second cover segment in the overlap area allows removal of the protector to the lower side of the vehicle, or through the bottom of the vehicle, without removing the second cover segment.

The one or more second cover segments may cover an extent of area, the one or more first cover segments may be disposed on right and left respective sides of the area covered, and the one or more battery attaching positions may be defined on the right and left respective sides of the area covered.

This structure enables attachment of the battery unit to the body or chassis of the vehicle on both the right and left sides of the battery unit. Consequently, the battery unit is more stably mounted on the vehicle, as compared with a case in which the battery unit is attached on its one side only.

The lower part structure of a vehicle disclosed in this specification enables release of the attachment of the battery unit and the body or chassis of the vehicle once the first cover segment is removed so that the battery unit can be demounted from the vehicle. This manner of removal makes it less troublesome to demount a battery unit from a vehicle, and thus improves easiness in maintenance of the battery units.

BRIEF DESCRIPTION OF DRAWINGS

Embodiment(s) of the present disclosure will be described by reference to the following figures, wherein.

DESCRIPTION OF EMBODIMENTS

Figure 1:
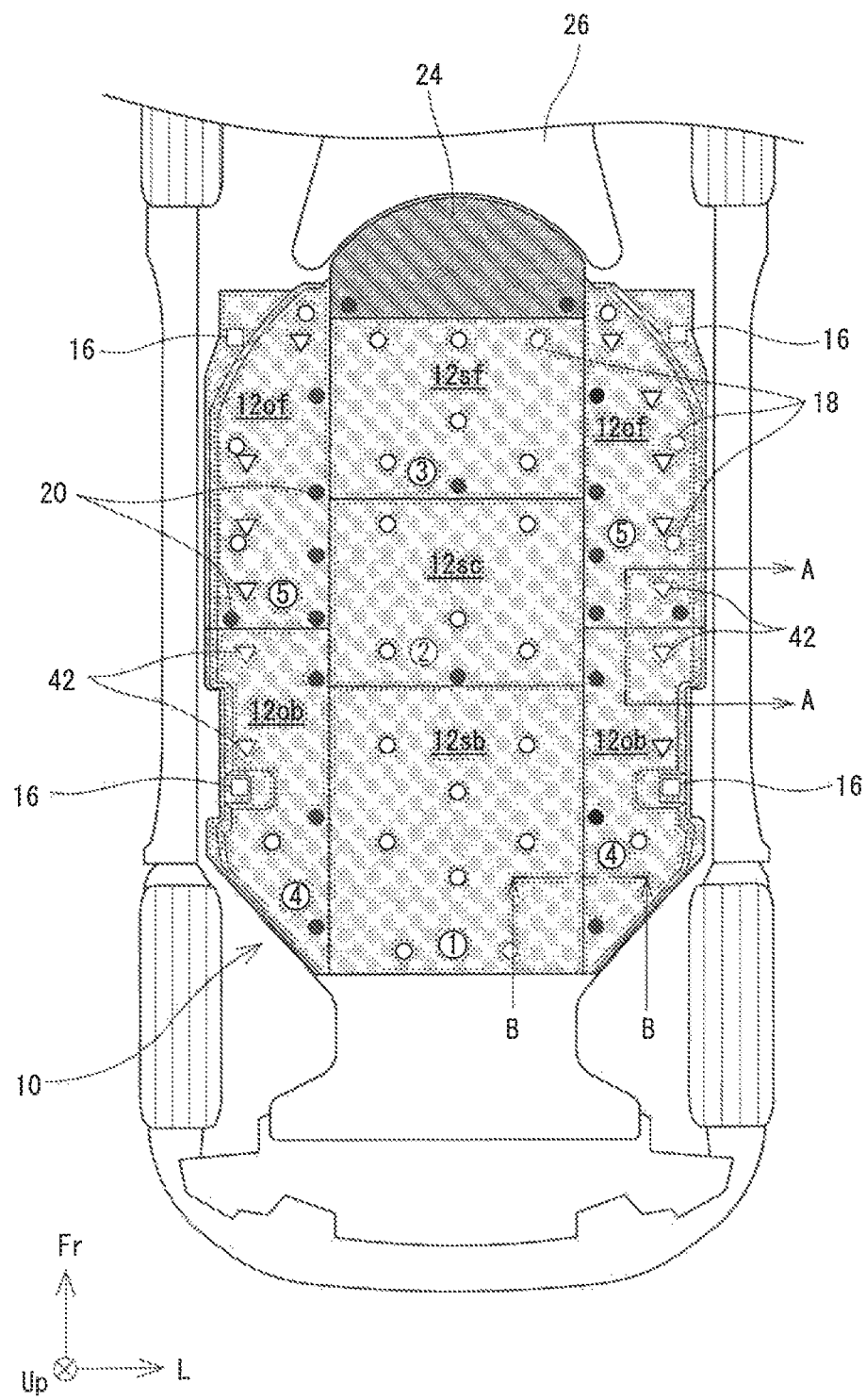
FIG. 1 is a bottom view of a vehicle.
Figure 2:
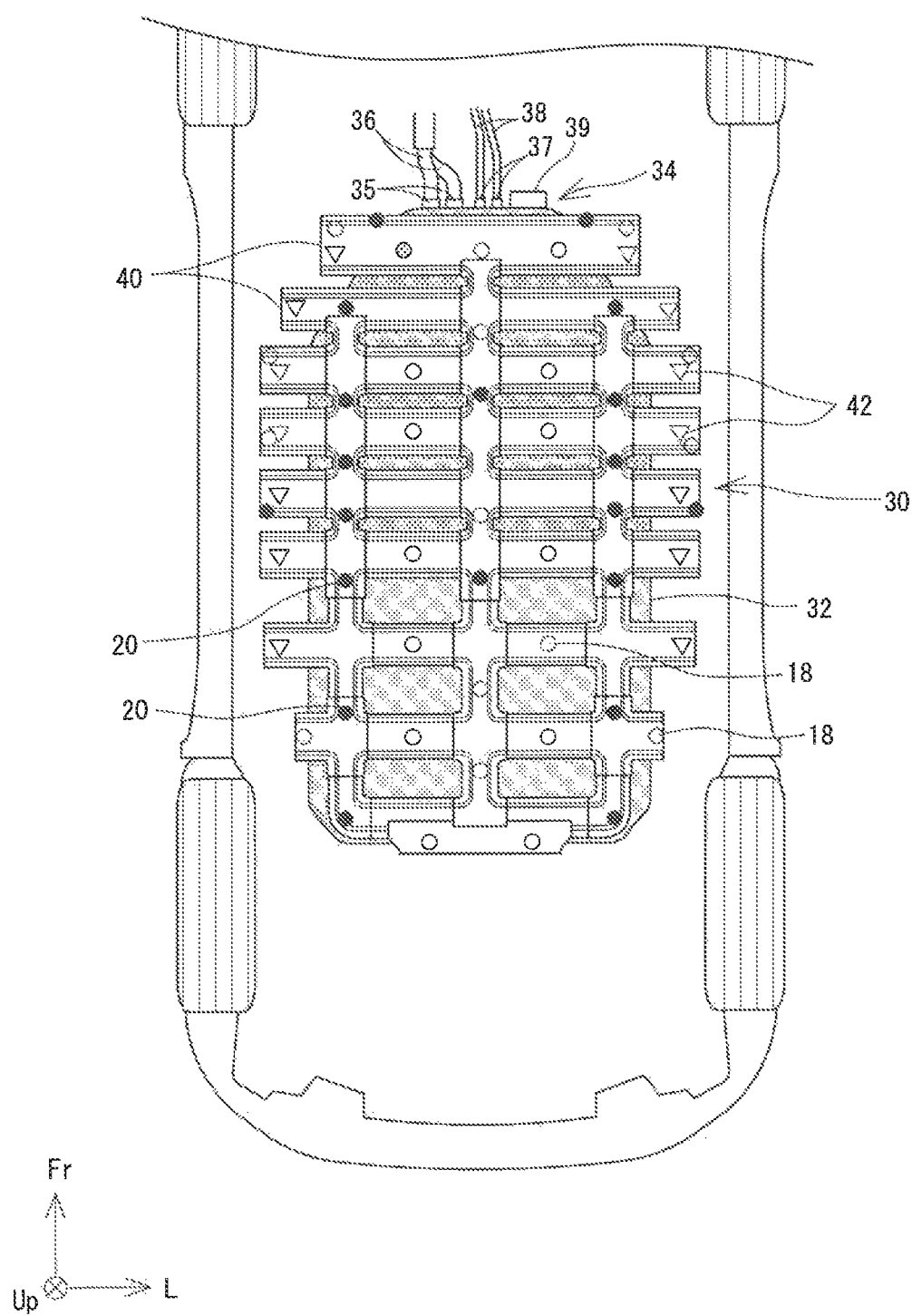
FIG. 2 is a bottom view of a vehicle with an under-cover removed from the vehicle.

The lower part structure of a vehicle will now be described with reference to the drawings. FIG. 1 is a bottom view of a vehicle. FIG. 2 is a bottom view of the vehicle with an under-cover 10 removed from the vehicle. In FIGS. 1 and 2, Fr indicates the forward direction of the vehicle, Up the upward direction, and L the left side. The directions such as the front, back, right, and left of a vehicle are those viewed from the driver. This vehicle is an electrically driven vehicle, such as a hybrid vehicle or an electric vehicle, equipped with a motor as one of the power sources.

The vehicle has a battery pack 32 disposed under the floor of the vehicle cabin, the battery pack 32 for storing power to be supplied to the motor. The battery pack 32 is attached to a battery frame 40, and the battery frame 40 supports the battery pack 32. The battery pack 32 and the battery frame 40 together constitute a battery unit 30. The battery pack 32 has a flat box-shaped enclosure. The battery pack 32 is relatively large, and has an area that occupies a majority of the space below the floor of the vehicle cabin. The battery pack 32 has terminals 35, 37 and a connection portion 34 at its front end. The terminals 35, 37 are used for electrical or mechanical connection to other devices. The connection portion 34 has a channel end 39.

The battery pack 32 incorporates in the enclosure, for example, a battery module including a plurality of battery devices, signal lines and power lines extending from the battery module, and a cooling channel. The power lines is used to receive power and is connected to power lines 36 extending from other electric devices (for example, an inverter or a charger) via the power terminals 35 on the connection portion 34. The signal lines extend from electronic components, such as various sensors (such as temperature sensors, voltage sensors, current sensors), a heater, or a relay, incorporated in the battery pack 32, and are connected via the signal terminals 37 on the connection portion 34 to signal lines 38 extending from other electric devices (for example, vehicle control devices). The cooling channel is a channel where air for cooling the batter module flows. The cooling channel is in communication with the inside of the vehicle cabin via the channel end 39 on the connection portion 34 and a cooling duct (not illustrated) extending from the channel end 39.

The battery frame 40 is a member that supports the battery pack 32. The battery frame 40 includes a plurality of frame segments (steel beams) assembled in a grid manner. The battery pack 32 is fixedly mounted on the battery frame 40. The battery frame 40 is attached to the body or chassis of the vehicle with screws at battery attaching positions 42 defined near each end line of the vehicle in the vehicle width direction. This attachment allows the battery pack 32 to be fixedly mounted below the floor of the vehicle. In FIGS. 1 and 2, each outlined triangle indicates the battery attaching position 42. As is obvious from FIGS. 1 and 2, seven battery attaching positions 42 align with intervals in the front-back direction of the vehicle in the vicinity of each of the right and left end lines of the vehicle body in the vehicle width direction in this embodiment. That is, fourteen battery attaching positions 42 are defined in total.

The battery frame 40 has an attachment slot for attachment to the under-cover 10 to be described later with a screw. The attachment position where the battery frame 40 is attached to the under-cover 10 will be hereinafter referred to as a "cover attaching position." Each outlined circle and each solid circle in FIGS. 1 and 2 respectively indicate cover attaching positions 18, 20. As is obvious from FIG. 2, the cover attaching positions 18, 20 are separately defined at various positions over the battery frame 40.

It is noted that the above-described structure of the battery unit 30 is a mere example, and any modification can be desirably made so long as the battery pack 32 is disposed below the floor of the vehicle and either directly or indirectly attached to the body or chassis of the vehicle. For example, the battery frame 40 may have a flat shape or a box-shape, so long as the battery frame 40 can support the battery pack 32. The battery frame 40 is omissible when the enclosure of the battery pack 32 is attached to the body or chassis of the vehicle and the under-frame. In this case, the battery unit 30 refers to the battery pack 32 alone.

The battery unit 30 is covered from below by the under-cover 10; that is, the lower side of the battery unit 30 is covered by the under-cover 10. The under-cover 10 is a panel member mounted to protect the battery unit 30 and to improve an aerodynamic characteristic of the vehicle. In this embodiment, the under-cover 10 is composed of a plurality of (seven in the illustrated example) segments; namely, cover segments 12*of*, 12*ob*, 12*sf*, 12*sc*, 12*sb*. The cover segments 12 will be hereinafter simply referred to as "a cover segment 12," "a first cover segment 12*o*," or "a second cover segment 12*s*" when distinction is unnecessary. The under-cover 10 is divided into a plurality of cover segments 12, as noted before, mainly due to convenience in manufacturing. That is, manufacturing a large monomerous under-cover 10 requires large-scaled manufacturing equipment and material, which increases the cost. In view of the above, the under-cover 10 is made by assembling a plurality of cover segments 12 in size readily made.

More specifically, the under-cover 10 includes three second cover segments 12*s* and four first cover segments 12*o*. The second cover segments 12*s* are disposed along the center line of the vehicle in the vehicle width direction. The four first cover segments 12*o* are disposed two on each of the right and left sides of the second cover segments 12*s*. Specifically, the first cover segments 12*o* include first front cover segments 12*of* and first back cover segments 12*ob* disposed behind the first front cover segments 12*of*. The second cover segments 12*s* include a second front cover segment 12*sf*, a second central cover segment 12*sc* disposed behind the second front cover segment 12*sf*, and a second back cover segment 12*sb* disposed behind the second central cover segment 12*sc*.

Each cover segment 12 is attached to the battery unit 30 (more accurately, to the battery frame 40) with an attachment bolt and a nut. Each outlined circle and each solid circle in FIG. 1 respectively indicate battery/cover attaching positions 18, 20 where cover segments 12 are attached to the battery frame 40. As is obvious from FIG. 1, the battery/cover attaching positions 18, 20 are present over all the cover segments 12. That is, the plurality of battery/cover attaching positions 18, 20 are separately present over the entire under-cover 10.

Each cover segment 12 is connected to other cover segments 12 adjacent thereto.

For example, the first front cover segment 12*of* is connected to the first back cover segment 12*ob*, the second front cover segment 12*sf*, and the second central cover segment 12*sc*. The second central cover segment 12*sc* is connected to the first front cover segments 12*of*, the first back cover segments 12*ob*, the second front cover segment 12*sf*, and the second back cover segment 12*sb*. In this embodiment, each cover segment 12 is disposed so as to partially overlap its adjacent cover segment 12. Specifically, a cover segment 12, its adjacent cover segment 12, and the battery frame 40 are all jointly attached with an attachment bolt and a nut in the overlap area. That is, the joint attachment area corresponds to a connection area where two cover segments 12 are connected to each other and also a battery/cover attaching position where the cover segments 12 are attached to the battery frame 40. In FIG. 1, each solid circle (reference numeral 20) indicates a connection position where the cover segments 12 are connected to each other and also a battery/cover attaching position where the cover segment 12 is attached to the battery frame 40.

The first cover segment 12*o* is further attached to the body (not illustrated) of the vehicle. In FIG. 1, each outlined rectangle (reference numeral 16) indicates the attachment position where the first cover segment 12*o* is attached to the body. As is obvious from FIG. 1, the under-cover 10 is attached to the body at its four corners. As is obvious from FIG. 1, the battery attaching positions 42 (outlined triangles) where the battery frame 40 is attached to the body are all covered by the first cover segments 12*o*. These battery attaching positions 42 are accessible from the lower side of the vehicle, or through the bottom of the vehicle, once the first cover segments 12*o* are removed from the vehicle. That is, removal of the first cover segments 12*o* allows to release of the attachment in the battery attaching positions 42, and thus demounting of the battery unit 30 from the vehicle.

The second cover segments 12*s* are positioned along the center line of the vehicle in the vehicle width direction and cover an extent of area. The first cover segments 12*o* are disposed on the right and left respective sides of the area covered by the second cover segments 12*s*. The second cover segments 12*s* are attached to the battery unit 30 and the first cover segments 12*o* but not to other segments. As is obvious from FIG. 1, the second cover segments 12*s* do not cover the battery attaching positions 42 (outlined triangles) where the battery frame 40 is attached to the body. Thus, removal of the second cover segments 12*s* from the battery unit 30 is unnecessary for release attachment of the battery unit 30 and the body in the battery attaching positions 42.

In FIG. 1, each encircled number indicates the order of assembling the plurality of cover segments 12. That is, the cover segments 12 are assembled to the vehicle in the order of the second back cover segment 12*sb*, the second central cover segment 12*sc*, the second front cover segment 12*sf*, the first back cover segment 12*ob*, and the first front cover segment 12*of*. To remove the cover segments 12 from the vehicle, the reversed order; namely, the first front cover segment 12*of*, the first back cover segment 12*ob*, the second front cover segment 12*sf*, the second central cover segment 12*sc*, and the second back cover segment 12*sb*, should be followed. That is, the first cover segments 12*o* can be removed from the body without removing the second cover segments 12*s*.

Figure 3:
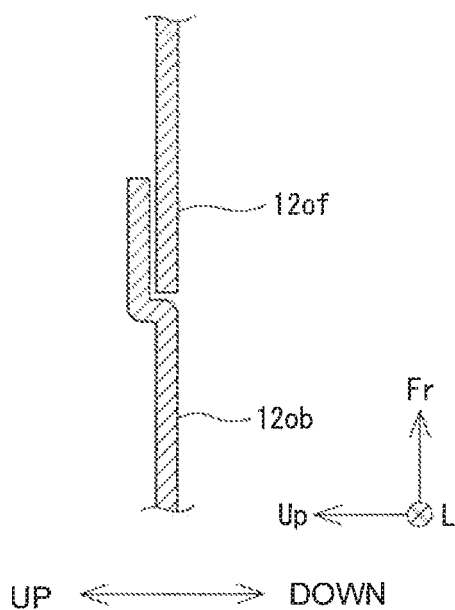
FIG. 3 is a cross sectional view of the under-cover along the line A-A in FIG. 1.
Figure 4:
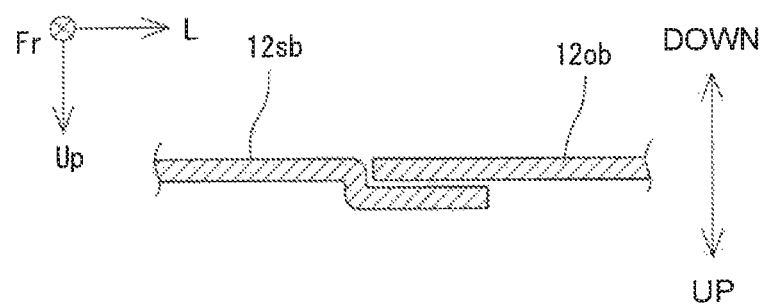
FIG. 4 is a cross sectional view of the under-cover along the line B-B in FIG. 1.

In order to enable removal in the above-described order, the adjacent cover segments 12 are placed in an overlap area such that one to be removed earlier is placed under one to be removed later. This will be described with reference to FIGS. 3 and 4. FIG. 3 is a cross sectional view of the under-cover 10 along the line A-A in FIG. 1. FIG. 4 is a cross sectional view of the under-cover 10 along the line B-B in FIG. 1.

As described above, as the front first cover segment 12*of* is to be removed prior to the back first cover segment 12*ob*, the back first cover segment 12*ob* is bent upward in a stepwise manner so that the first front cover segment 12*of* is positioned under the back first cover segment 12*ob* in an overlap area of the front first cover segment 12*of* and the back first cover segment 12*ob*, as illustrated in FIG. 3. Similarly, as the back first cover segment 12*ob* is to be removed prior to the back second cover segment 12*sb*, the back second cover segment 12*sb* is bent upward in a stepwise manner so that the back first cover segment 12*ob* is positioned under the back second cover segment 12*sb* in an overlap area of the back first cover segment 12*ob* and the back second cover segment 12*sb*, as illustrated in FIG. 4.

It is noted that all the first cover segments 12*o* can be removed prior to any second cover segment 12*s*, as described above. Thus, the first cover segment 12*o* is always positioned under the second cover segment 12*s* in areas where these segments 12*o*, 12*s* overlap each other.

This partially overlapping placement of the cover segments 12 eliminates the space between the cover segments 12 and thus can more reliably protect the battery unit 30. Further, disposition of a cover segment 21 to be removed earlier under one to be removed later in an overlap area facilitates removal of the cover segment 12 to be removed earlier from the lower side of the vehicle.

The under-cover 10 has a protector 24 on its front end. The protector 24 covers the connection portion 34 of the battery unit 30 from below. The front end of the protector 24 is connected to the chassis (a suspension member 26 in the illustrated example) of the vehicle. Meanwhile, the back end of the protector 24 is connected to the second front cover segment 12*sf* and also to the battery frame 40 with screws.

The protector 24 can be removed from the vehicle without removing the second cover segment 12*s* from the vehicle. The back end of the protector 24 overlaps the second front cover segment 12*sf* so as to be placed under the second front cover segment 12*sf* in the overlap area. Removal of the protector 24 allows access to the connection portion 34 of the battery pack 32 from below, and thus release of the electrical or mechanical connection between the battery pack 32 and other devices.

The steps of maintenance of the battery pack 32 of a vehicle having the above mentioned structure will now be described. For maintenance of the battery pack 32, the battery unit 30 is normally demounted from the vehicle. Specifically, the battery unit 30 can be demounted from the lower side of the vehicle.

To demount the battery unit 30 from the vehicle, the under-cover 10 and the protector 24, which are disposed under the battery unit 30, are first removed from the vehicle. Unfortunately, removing all the cover segments 12 constituting the under-cover 10 from the vehicle is troublesome. In view of the above, this embodiment makes it possible to demount the battery unit 30 from the vehicle once only some of the cover segments 12 are removed from the vehicle.

Specifically, in order to demount the battery unit 30 from the vehicle, an operator initially removes the protector 24 from the vehicle. That is, the operator releases the attachment of the protector 24 and the suspension member 26 and that of the protector 24, the battery frame 40, and the second front cover segment 12*sf*, and then removes the protector 24 from the vehicle. With the protector 24 removed from the vehicle, the connection portion 34 of the battery pack 32 is exposed outside. With the exposure, the operator can disconnect the power line 36, the signal line 38, and the cooling duct from the battery pack 32.

The operator then removes the first front cover segments 12*of* from the vehicle. That is, the operator releases the attachment of the first front cover segment 12*of* and the vehicle body, that of the first front cover segment 12*of* and the second cover segment 12*s*, and that of the first front cover segment 12*of* and the battery unit 30. Having removed the first front cover segments 12*of*, the operator now removes the first back cover segments 12*ob* from the vehicle, following a similar procedure.

With the first front cover segments 12*of* and the first back cover segments 12*ob* removed from the vehicle, the battery attaching position 42 where the battery unit 30 is attached to the body of the vehicle is exposed outside. The operator then releases the attachment of the battery unit 30 and the body of the vehicle. The release enables separation of the battery unit 30 from the vehicle.

The second cover segments 12*s* then remain attached on the battery unit 30. Since the second cover segments 12*s* are attached to the battery unit 30 alone but not to any other members, the second cover segments 12*s* will be removed from the vehicle together with, while being attached on, the battery unit 30 once the battery unit 30 is demounted from the vehicle.

Once the battery unit 30 is demounted from the vehicle, the operator performs various operations to maintain the battery pack 32 outside of the vehicle. After completion of the maintenance, the battery pack 32, the first cover segments 12*o*, and the protector 24 are put back to the vehicle following the reversed procedure from the above.

As is obvious from the above description, in this embodiment, the under-cover 10 is composed of the first cover segments 12*o* and the second cover segments 12*s*, in which the first cover segments 12*o* are attached to the vehicle and cover the battery attaching positions 42 from below, and the second cover segments 12*s* neither attach to the vehicle nor cover the battery attaching positions 42 from below. This structure makes it possible to demount the battery unit 30 from the vehicle once the first cover segments 12*o* alone are removed from the vehicle, without removing the second cover segments 12*s* from the vehicle. Consequently, demounting (for maintenance) the battery unit 30 is less troublesome.

It should be noted that the above-described structure is a mere example, and structures in the lower part of a vehicle other than the under-cover 10 including the first cover segments 12*o* covering the battery attaching positions 42 from below and the second cover segments 12*s* attached to the battery unit 30 and not covering the battery attaching positions 42 from below can be desirably modified. For example, whereas the first cover segments 12*o* are disposed on the left and right sides of the second cover segments 12*s* in this embodiment, the first cover segments 12*o* may be disposed in a different manner. For example, in the case where the plurality of battery attaching positions 42 align with intervals in the vehicle width direction in the vicinity of the front and back end lines of the battery unit 30, the first cover segments 12*o* may be disposed ahead of and behind the second cover segments 12*s*. Alternatively, the first cover segments 12*o* may be disposed along the center line of the vehicle in the vehicle width direction and the second cover segments 12*s* may be disposed on the respective sides of the first cover segments 12*o* in the vehicle width direction, depending on the disposition of the battery attaching positions 42 and that of the attachment positions of the under-cover 10 and the vehicle. Whereas every first cover segment 12*o* is attached to the vehicle and covers the battery attaching position 42 in this embodiment, the first cover segments 12*o* may include one that covers the battery attaching position 42 but is not attached to the vehicle.

The invention claimed is:

1. A lower part structure of a vehicle, comprising:
   a battery unit disposed under a floor of a vehicle, and attached to a body or a chassis of the vehicle at one or more battery attaching positions; and
   an under-cover disposed below the battery unit, the under-cover including one or more first cover segments and one or more second cover segments,
   wherein
   the one or more first cover segments cover the battery attaching position from below, and
   the one or more second cover segments are attached to the battery unit and do not cover the battery attaching position from below.

2. The lower part structure of a vehicle according to claim 1, wherein
   the first cover segment partially overlaps a part of the second cover segment in a top view; and
   the first cover segment is positioned lower than the second cover segment in an area where the first cover segment overlaps the part of the second cover segment.

3. The lower part structure of a vehicle according to claim 1, wherein
   the battery unit has one or more connection portions at one end thereof, the connection portion for electrical or mechanical connection to another device,
   the lower part structure includes a protector for covering the one or more connection portions from below, and
   the protector is removable from the vehicle without removing the second cover segment from the vehicle.

4. The lower part structure of a vehicle according to claim 3, wherein
   the protector partially overlaps a part of the second cover segment in a top view, and
   the protector is positioned lower than the second cover segment in an area where the protector overlaps the second cover segment.

5. The lower part structure of a vehicle according to claim 1, wherein
   the one or more second cover segments cover an area,
   the one or more first cover segments are disposed on right and left respective sides of the area covered, and the one or more battery attaching positions are defined on the right and left respective sides of the area covered.

* * * * *